(12) United States Patent
Tuyls et al.

(10) Patent No.: US 8,886,951 B2
(45) Date of Patent: Nov. 11, 2014

(54) METHOD, APPARATUS AND SYSTEM FOR VERIFYING AUTHENTICITY OF AN OBJECT

(75) Inventors: Pim Theo Tuyls, Eindhoven (NL); Boris Skoric, Eindhoven (NL); Stefan Jean Maubach, Nijmegen (NL); Robertus Adrianus Maria Wolters, Eindhoven (NL)

(73) Assignee: Intrinsic ID B.V., Eindhoven (NL)

( * ) Notice: Subject to any disclaimer, the term of this patent is extended or adjusted under 35 U.S.C. 154(b) by 1915 days.

(21) Appl. No.: 11/993,724

(22) PCT Filed: Jul. 4, 2006

(86) PCT No.: PCT/IB2006/052237
§ 371 (c)(1),
(2), (4) Date: Jan. 22, 2010

(87) PCT Pub. No.: WO2007/007229
PCT Pub. Date: Jan. 18, 2007

(65) Prior Publication Data
US 2010/0122093 A1    May 13, 2010

(30) Foreign Application Priority Data
Jul. 7, 2005  (EP) .................................... 05106196

(51) Int. Cl.
*G06F 21/00* (2013.01)
*H04L 9/32* (2006.01)
*G06F 21/34* (2013.01)
*G06F 21/33* (2013.01)
*G07C 9/00* (2006.01)

(52) U.S. Cl.
CPC .............. *G06F 21/34* (2013.01); *H04L 9/3234* (2013.01); *H04L 9/321* (2013.01); *H04L 9/3278* (2013.01); *H04L 2209/08* (2013.01); *H04L 9/3218* (2013.01); *H04L 9/3221* (2013.01); *G06F 21/33* (2013.01); *G07C 9/00007* (2013.01); *H04L 2209/805* (2013.01)
USPC ........................................................ 713/185

(58) Field of Classification Search
CPC .... H04L 9/3278; H04L 9/3218; H04L 9/3221
USPC ........................................................ 713/185
See application file for complete search history.

(56) References Cited

U.S. PATENT DOCUMENTS 5,140,634 A    8/1992  Guillou et al.
5,818,738 A   10/1998  Effing
(Continued)

FOREIGN PATENT DOCUMENTS

WO          03050757 A1    6/2003
WO     WO 2004/054168  *  6/2004  ................ H04L 9/32

OTHER PUBLICATIONS

Tuyls, Capacity and Examples of Template-Protecting Biometric Authentication Systems, May 2004, Lecture Notes in Computer Science, vol. 3087, Retrieved from the internet <URL: springerlink.com/content/u3fuk1u5by3n/>,pp. 1-14 as printed.*
(Continued)

*Primary Examiner* — Michael Chao
(74) *Attorney, Agent, or Firm* — Thorne & Halajian, LLP; Gregory L. Thorne

(57) ABSTRACT

The invention relates to a method for proving authenticity of a prover PRV to a verifier VER, the method comprising generating a secret S using a physical token by the prover PRV. Obtaining a public value PV by the verifier, where the public value PV has been derived from the secret S using a function for which the inverse of said function is computationally expensive. The method further comprising a step for conducting a zero knowledge protocol between the prover PRV and the verifier VER in order to prove to the verifier VER, with a pre-determined probability, that the prover PRV has access to the physical token, where the prover PRV makes use of the secret S and the verifier VER makes use of the public value PV. The invention further relates to a system employing the method, and an object for proving authenticity.

26 Claims, 6 Drawing Sheets

(56) References Cited

U.S. PATENT DOCUMENTS

| | | | |
|---|---|---|---|
| 6,047,242 A * | 4/2000 | Benson | 702/35 |
| 6,088,453 A * | 7/2000 | Shimbo | 380/28 |
| 6,854,057 B2 * | 2/2005 | Roskind et al. | 713/156 |
| 7,245,718 B2 * | 7/2007 | Sundaram et al. | 380/30 |
| 7,490,070 B2 * | 2/2009 | Brickell | 705/75 |
| 7,840,806 B2 * | 11/2010 | Hammond et al. | 713/169 |
| 2003/0063772 A1 * | 4/2003 | Smith et al. | 382/100 |
| 2003/0204743 A1 | 10/2003 | Devadas et al. | |
| 2007/0106892 A1 * | 5/2007 | Engberg | 713/168 |
| 2009/0183248 A1 * | 7/2009 | Tuyls et al. | 726/9 |

OTHER PUBLICATIONS

Gassend et al.; Controlled Physical Random Functions; 2002; Retrieved from the Internet <URL: ieeexplore.ieee.org/xpls/abs_all.jsp?arnumber=1176287&tag=1>; pp. 1-12 as printed.*

Gassend et al.; Physical Random Functions; 2003; Retrieved from the Internet <URL: textfiles.com/bitsavers/pdf/mit/lcs/tr/MIT-LCS-TR-881.pdf>; pp. 1-89 as printed.*

Gassend et al.; AEGIS: Architecture for Tamper-Evident and Tamper-Resistant Processing; Retrieved from the Internet <URL: http://citeseerx.ist.psu.edu/viewdoc/download?doi=10.1.1.14.5479&rep=rep1&type=pdf>; pp. 1-12 as printed.*

B. Skoric, et al: Robust Key Extraction from Physical Uncloneable Functions, ACNS 2005, LNCS 3531 Lecture Notes in Computer Science, Springer Verlag, pp. 407-422.

Sanjay E. Sarma, et al: RFID Systems and Security and Privacy Implications, CHES 2002, LNCS 2523, Feb. 10, 2005, pp. 454-469.

Menes A. J. et al: Handbook of Applied Cryptography, Passage, Handbook of Applied Cryptography, CRC, Press Series on Discrete Mathematics and Its Applications, 10.3 Challenge-Response Identification, (strong authentication) 1997, pp. 397-400.

Sanjay E. Sarma, et al: I. Radio-Frequency Identification: Security Risks and Challenge, Cryptobytes, RSA Lab. vol. 6, No. 1, Mar. 2003, pp. 1-32.

* cited by examiner

METHOD, APPARATUS AND SYSTEM FOR VERIFYING AUTHENTICITY OF AN OBJECT

The invention relates to a method for proving authenticity of a prover to a verifier. The invention further relates to an object for proving authenticity, the object comprising; a secret generation means arranged to generate a secret S using a physical token. The invention also relates to a system for proving the authenticity of an object to an apparatus for verifying authenticity.

The loss of revenues due to counterfeited and pirated objects constitutes a serious economic threat to manufacturers, and vendors alike. Products that are known to be susceptible to counterfeit practices range from watches, clothing, shoes, jewelry, CDs, DVDs, to software.

Proof of authenticity is also a major issue for documents such as passports, driver's licenses, and banknotes. These documents are enabling, and therefore valuable. Passports and banknotes are good examples of documents that have been fitted with a multitude of means to prove authenticity.

There is no clear definition of products that are susceptible to counterfeiting and piracy, there is however communality; they are desirable and generally there is either cost or effort involved in obtaining the authentic product. In response to counterfeiting and piracy legitimate vendors have added means to prove authenticity to their products such as holographic stickers.

In US2003/0063772 a method is presented for authenticating a work piece that includes an optically active medium. The method can be used for establishing the validity of the work piece. Validity is established using a string that at least in part is based upon the optical characteristics of an optically active medium that is included on or embedded in one or more portions of the work piece.

A problem of this method is that when authenticity of a work piece is established information from the work piece is exposed, in particular the response from said optically active element. Said information can be used for duplicating a work piece or its behavior.

It is an object of the present invention to provide a sufficient proof of authenticity of a prover using a physical token to a verifier that reduces the exposed information regarding the response of the physical token to the verifier.

This objective is realized in that the method as set forth in the introductory paragraph comprises the following steps: generating, by the prover a secret S using a physical token, obtaining, by the verifier, a public value PV which has been derived from the secret S using a function F, and where the function F is selected such that it is computationally expensive to establish the secret S given the public value PV, and conducting a zero knowledge protocol between the prover and the verifier in order to prove to the verifier, with a pre-determined probability, that the prover has access to the physical token, where the prover makes use of the secret S and the verifier makes use of the public value PV.

In conventional methods that use a physical token to prove authenticity, unique characteristics of the physical token are used to sufficiently prove that the prover has access to the physical token. To this end the physical token is challenged using a challenge response means in order to evoke a unique response from the physical token. This unique response is then used by the verifier to verify the prover's authenticity. In the process the response is exposed to the verifier and/or other malicious parties.

In contrast the present invention proposes to generate a secret S from said response. This secret S is used to generate an accompanying public value PV. The public value PV can be used in conjunction with the secret S for conducting a zero knowledge protocol. The zero knowledge protocol can be selected from a variety of zero knowledge protocols known to a person skilled in the art.

The zero knowledge protocol exploits the fact that a prover can be challenged in such a way that only a prover who has access to said secret, can respond correctly and reliably. The verifier can verify whether the response of the prover is correct by using the public value PV derived from the secret S. The public value PV is derived from the secret S using a function F. In order not to expose the secret S, the function F has to be chosen such that it is computationally expensive, to calculate the secret S given the public value PV.

By repeatedly challenging the prover and verifying its response the verifier can further reduce the probability that a malicious prover can cheat by continuously guessing the correct answers. It is possible to, a priori, determine the exact number of iterations needed to thwart a malicious user with a pre-determined probability in the range of [0, 1).

In doing so the present invention provides a sufficient proof of authenticity of the prover in a secure fashion that reduces the exposed information regarding the response of the physical token to the verifier.

To generate the public value PV from the secret S, a preferred embodiment will apply a one-way function, or a trap-door one-way function. A one-way function is a mathematical function that is significantly easier to compute in one direction than in the opposite direction. A one-way function can be used to compute the public value PV from the secret S in (fractions of) seconds. However to compute the secret S given the public value PV could take months to centuries. A trap-door one-way function is a one-way function for which the inverse direction is easy given a certain piece of information, but difficult otherwise. Most public-key cryptosystems are based on (presumed) trapdoor one-way functions.

An embodiment of the present invention establishes a secret S using a physical token. To this end the physical token can be combined with a challenge response means. The challenge response means presents a challenge C to the physical token. In return the token responds with a response R that is measured by the challenge response means. This measured response is used to generate the secret S. Although it is possible to use the measured response R directly, further processing is generally needed to improve noise robustness. Such processing can involve the use of so-called helper data.

Helper data can be used for:

1. Randomization Purposes

Helper data can be used to randomize the response of the physical token. By storing a pre-determined random data for a particular challenge it is possible to combine the helper data and the measured response such that the combined data is randomized and no longer correlated to the response R from the physical token.

2. Noise Compensation Purposes

In preparation for a later authentication helper data can be constructed for each individual challenge response pair that can be used during authentication. During authentication the helper data H and the response R are combined and an Error Correcting Code is applied to capitalize on the redundancy to correct errors introduced during the acquisition process.

A preferred embodiment of the present invention is a method according to the present invention where the secret S, is generated anew each time the secret S is needed. In doing so the prover does not need to store the secret S or intermediate values. This complicates matters for malicious parties that attempt to retrieve the secret S.

The secret S is used once per iteration of the zero knowledge protocol. When the protocol requires many iterations it can be advantageous to temporarily store the secret S in a temporary storage instead of re-generating the secret S every time. However care should be taken to delete the secret S, and intermediate values once they are no longer needed.

A further object of the present invention is to provide an object that can provide a sufficient proof of authenticity using a physical token to an apparatus for verifying authenticity that reduces the exposed information regarding the response of the physical token to the apparatus for verifying authenticity.

This objective is realized in that the object as set forth in the introductory paragraph is characterized in that it further comprises a first zero knowledge protocol means arranged to conduct a zero knowledge protocol with an apparatus for verifying authenticity, in order to prove to the apparatus for verifying authenticity, with a pre-determined probability, that the object has access to the physical token, using the secret S.

In one embodiment an object for proving authenticity is fitted with means for wireless Near Field Communication. As a result such an object can conduct the aforementioned zero knowledge protocol over a wireless channel with an apparatus for verifying authenticity, provided both devices are in proximity.

An alternate advantageous embodiment of an object according to the invention comprises storage means for storing a certificate, signed by the Trusted Third Party TTP, comprising the public value PV. By sending the certificate to the apparatus for verifying authenticity the object can provide the apparatus with the public value PV before starting the zero knowledge protocol. The verifier can verify that the public value PV is legitimate by verifying the signature of the Trusted Third Party on the certificate.

As a result authenticity can be verified off-line, without the need to maintain a database of public values. The ability to work off-line allows applications such as the validation of authenticity of consumer products using a simple hand-held apparatus for verifying authenticity. As there is no a database involved in this particular embodiment, storage requirements can be kept to a minimum, and above all, there is no need to maintain and or share such a database.

A further object of the present invention is to provide a system for applying the object according to the present invention.

This objective is realized in that the system as set forth in the introductory paragraph comprises: an object according to the present invention and an apparatus for verifying authenticity, wherein the apparatus for verifying authenticity comprises; an obtaining means arranged to obtain a public value PV which has been derived from the secret S, a second zero knowledge protocol means arranged to conduct the zero knowledge protocol with the first zero knowledge protocol means, in order to verify, with the predetermined probability, that the object has access to the physical token, using the public value PV.

The present invention can be used in a system that first establishes authenticity, before proceeding to a more elaborate information exchange, such as a key exchange, or setting up a Secure Authenticated Channel. The same procedure could be repeated with the roles of prover and verifier reversed, thereby establishing that both parties in fact are authentic before proceeding. This way information leakage to non-authentic equipment can be prevented.

The present invention can be used in access control systems. Here access control could relate to access to a physical location, to information, to equipment, to a communication channel, or to a service.

These and other aspects of the invention will be further elucidated and described with reference to the drawing, in which.

Throughout the drawing, the same reference numeral refers to the same element, or an element that performs the same function.

Figure 1:
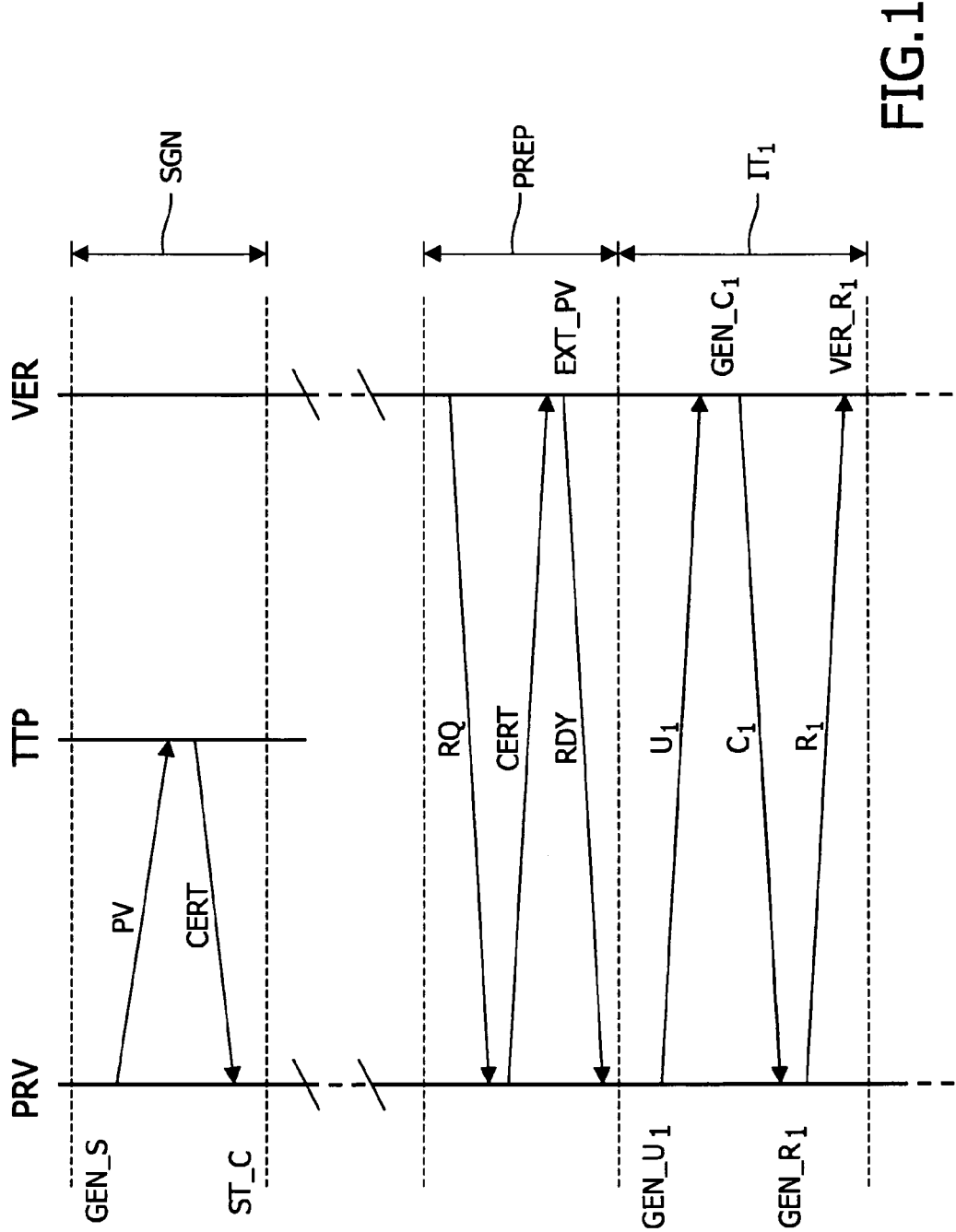
FIG. 1 is a communication diagram depicting a single iteration in a zero knowledge protocol in a method according to the present invention as well as the preparations for that iteration.

To thwart counterfeiters manufacturers have fitted products with various means that help establish authenticity. Examples of such means are holographic stickers and labels that are being used to provide a proof of authenticity for pre-recorded media such as CDs and DVDs. Although currently hard to copy, these labels generally are not unique and do not allow authentication of individual products.

With the introduction of relatively cheap and reliable physical tokens such as used in US2003/0063772 the problem of authenticating individual products can be tackled. Suitable physical tokens are generally very hard to clone or duplicate. For this reason such physical tokens are also referred to as Physical Uncloneable Functions, or PUFs.

A physical token is often a complex physical system comprising many randomly distributed components. When probed with suitable challenges, the complex physics governing the interaction between the physical token and the challenge, e.g. multiple scattering waves in a disordered medium, leads to a random-looking output, or response, for each separate challenge. The complex small-scale structure of the physical token makes it hard to produce a physical copy.

For example, an optical physical token could comprise an optical medium containing many randomly distributed light scatterers. A challenge could be an incident beam, the response is then the consequent speckle pattern detected by a detector. The pattern of bright and dark spots can be converted into a bit string for further use in authenticating a product.

A problem with physical tokens, in contrast to digital tokens, is that the responses are susceptible to noise and perturbations, causing differences in responses for identical challenges. Such acquisition noise can have many causes, e.g. token/detector misalignment, or environmental effects such as temperature, moisture and vibrations. Due to the noise, the bit string that is extracted from a response may contain errors.

Most cryptographic protocols however require that the bit string obtained is identical each time the physical token is challenged with a particular challenge. For example if the bit string is used as an encryption key, toggling a single bit will yield unrecognizable, useless results.

To obtain more robust responses from the combination of the physical token and the challenge response means an Error Correcting Code can be applied. To this end a helper data can be generated for individual challenge response pairs for the physical token prior to the actual authentication. Given a particular challenge a helper data can be constructed that in combination with the measured response provides a redundant representation of the response. An Error Correcting Code can capitalize on this redundancy and correct bit errors resulting from the acquisition process.

As indicated earlier on helper data can also be used to randomize the secret S, for example by exclusive or-ing the response R with the helper data. This randomization process can be used for re-using challenge response pairs for different purposes. As such the randomization process does not add security, but acids flexibility. Other uses of helper data may include the generation of a secret S' that is shared by various provers, but based on different physical tokens.

FIG. 1 presents a graphical representation of the communication between a prover PRV, a Trusted Third Party TTP, and a verifier VER in a method according to the present invention. The prover PRV has at least one secret S that can be generated using a physical token. The prover PRV can generate the secret S anew every time he desires to do so using the physical token. Effectively the secret S is stored inside the physical token.

During the proof of authenticity the prover PRV cannot expose the secret S, as this would compromise security. The present invention provides a method that allows the prover PRV to prove authenticity to the verifier VER using the secret S, without exposing the secret S to the verifier VER. To this end a public value PV is generated that is based on the secret S. To avoid exposing the secret S, the public value PV can be generated using a one-way function, or a trapdoor one-way function. Which particular function is applied is determined by the choice of a zero knowledge protocol.

Once the prover PRV has generated the secret S a public value PV can be generated. The public value PV can be generated by the prover PV, or by a Trusted Third Party TTP. Once a public value PV is generated a Certification Authority can sign it, resulting in a certificate. The verifier VER can verify the signature of the Certification Authority, thereby establishing that the public value PV is indeed genuine. Alternatively a Trusted Third Party TTP can sign the public value PV as depicted in FIG. 1, resulting in a certificate CERT.

The certificate CERT from the Trusted Third Party TTP can consist of a single public value PV or a link to the public value PV. Such a link could be a URL indicating where the verifier can obtain the actual public value PV. Alternatively the certificate CERT could comprise a variety of public values for one or multiple provers. When multiple challenge response pairs are available for a prover PRV, the verifier VER could select a particular challenge and in doing so further complicate matters for malicious parties.

In a particularly advantageous embodiment the prover PRV provides the verifier VER with a certificate CERT signed by a Trusted Third Party TTP that comprises the public value PV for which the prover PRV can generate the accompanying secret S. The verifier VER can extract the public value PV, and verify using the signature that the public value PV is legitimate, thereby facilitating off-line proof of authenticity, without the need for a database of public values.

The communication is FIG. 1 is divided in three steps: (i) a step SGN during which the public value PV is exchanged and signed by a Trusted Third Party, (ii) a step PREP for preparation of, and (iii) a step $IT_1$ comprising an iteration of a zero knowledge protocol.

In the first step SGN, the prover provides the public value PV to the Trusted Third Party TTP. In response the Trusted Third Party TTP signs the public value PV and returns a certificate comprising the public value to the prover PRV. The prover then stores the certificate CERT.

Although in the embodiment in FIG. 1 the prover PRV provides the public value PV to the Trusted Third Party TTP, the prover PRV could alternatively provide the secret S, and let the Trusted Third Party TTP perform the one-way function F. This would expose the secret S during signing, but could simplify matters for the prover PRV, particularly when the one-way function F involves complex operations.

During the second step PREP the verifier VER requests a certificate CERT comprising the public value PV from the prover PRV. The prover PRV provides the certificate CERT to the verifier VER. In turn the verifier VER extracts the public value PV. The verifier VER can check the signature on the certificate CERT using a public key of the Trusted Third Party, and thereby establish authenticity of the public value PV.

In the third step $IT_1$ a single iteration of the zero knowledge protocol takes place. The prover PRV generates a commitment value $U_1$ based on a randomization factor. The commitment value $U_1$ is submitted to the verifier VER, the verifier generates a challenge value $C_1$ and submits it to the prover PRV.

Based on the randomization factor, the challenge value $C_1$, and the secret S the prover generates a response $R_1$. This response is sent to the verifier VER, who based on $U_1$, and the public value PV verifies whether the response $R_1$ is consistent with the response of a prover that knows the secret S.

Figure 2:
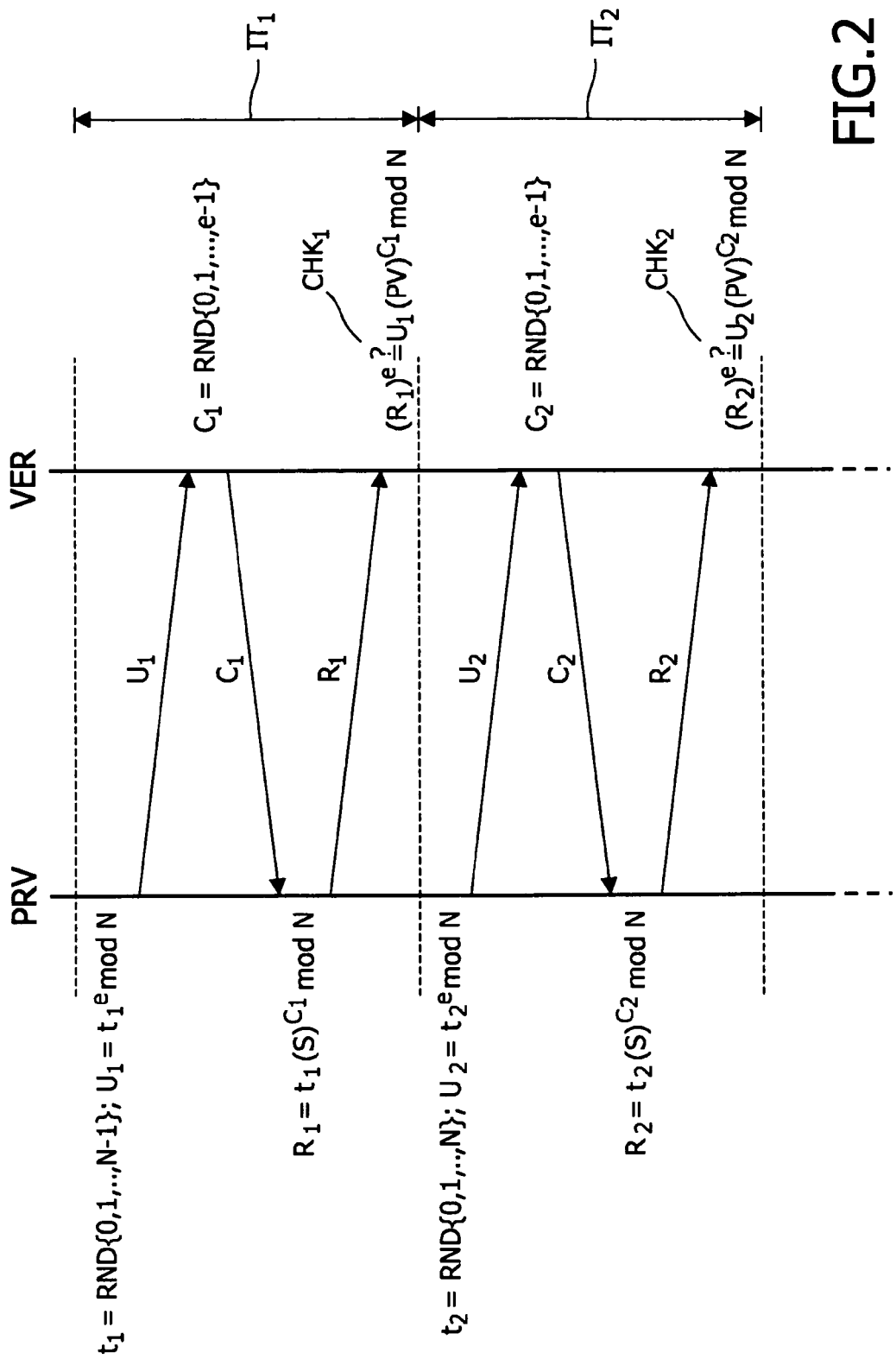
FIG. 2 is a communication diagram depicting two iterations in the Guillou-Quisquater zero knowledge protocol in a method according to the present invention.

FIG. 2 provides a more detailed view of the details of a zero knowledge protocol according to Guillou-Quisquater as disclosed in U.S. Pat. No. 5,140,634. The Guillou-Quisquater zero knowledge protocol, hereafter GQ ZKP, exploits the fact that it is difficult to calculate the $e^{th}$ root of a value modulo N.

For GQ ZKP, the public value can be written as:

$$PV = S^e \bmod N$$

Where e is a prime number, and N is the product of two prime numbers p and q. Both the prover PRV and the verifier VER know the values of e and N. The security of the protocol can be improved by selecting a larger N.

FIG. 2 depicts two iterations of the GQ ZKP. During the first iteration $IT_1$ the prover PRV selects a random value $t_1$ from the range $\{0, 1, \ldots, N-1\}$. This value is used to calculate the commitment $U_1$.

$$U_1 = t_1^e \bmod N$$

$U_1$ is transmitted to the verifier VER. The verifier VER selects a random challenge value from $C_1$ from the range $\{0, 1, \ldots, e-1\}$ and sends it to the prover PRV. The prover PRV now calculates a response $R_1$ using the secret S, the random value $t_1$, and the challenge $C_1$. This response is sent to the verifier VER.

$$R_1 = t_1 S^{C_1} \bmod N$$

The verifier VER can now verify whether the following equation holds:

$$(R_1)^e = U_1 (PV)^{C_1} \bmod N$$

If this equation holds then the prover PRV is legitimate and has access to the secret S. Alternatively the prover PRV could be a fraud that has cheated by guessing the challenge $C_1$ and fabricating a response $R_1$. The probability that a malicious prover can cheat this way is 1/e. By increasing the number of iterations used in the zero knowledge protocol the probability that a malicious user can repeatedly guess the correct response value $R_1$ can be further reduced. Given a pre-determined reliability requirement it is possible to choose the appropriate number of iterations to accomplish a sufficient level of reliability.

Although the example depicted in FIG. 2 presents the Guillou-Quisquater zero knowledge protocol, the present invention can also be used in conjunction with other zero knowledge protocols known to people skilled in the art. Well known zero knowledge protocols rely on the fact that certain calculations are known to be difficult, or computationally expensive. Two examples of such calculations are: (i) prime factorization (at the basis of the RSA algorithm), or (ii) calculating discrete logarithms (at the basis of the ElGamal algorithm).

In comparison zero knowledge protocols that are based on calculating discrete logarithms, and in particular (hyper-) elliptic curve discrete logarithms, tend to result in more compact hardware solutions, and hence are considered advantageous.

An object PRVR for proving authenticity according to the invention can be shipped together with a product that has to be authenticated. Alternatively the object PRVR could be embedded in the product, and/or could even share functional components of that product.

Figure 3:
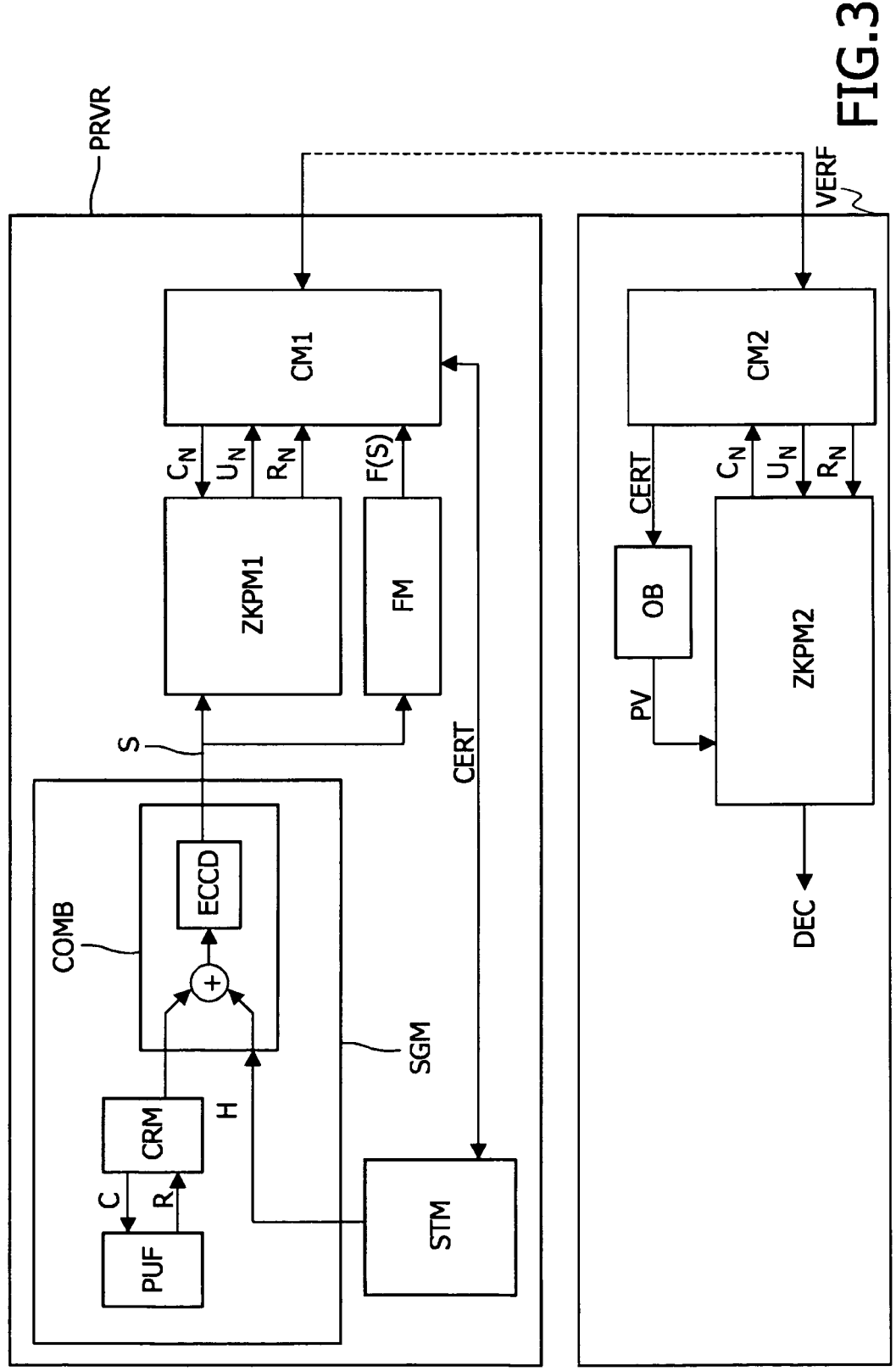
FIG. 3 is a block diagram comprising an object for proving authenticity according to the present invention, and an apparatus for verifying authenticity.

FIG. 3 depicts an object PRVR for proving authenticity. In the block diagram a secret generation means SGM is depicted in which a challenge response means CRM provides a challenge C to a physical token PUF. This challenge results in a response R that is measured by the challenge response means and is subsequently used to generate a secret S.

The secret S is used in a first zero knowledge protocol means ZKPM1 to execute a zero knowledge protocol with an apparatus for verifying authenticity VERF. The first zero knowledge protocol means ZKPM1 is arranged to exchange at least one randomization value $U_N$, at least one challenge $C_N$, and at least one response $R_N$ with the apparatus for verifying authenticity VERF.

The embodiment of the object PRVR for proving authenticity depicted in FIG. 3 further comprises a combiner COMB, arranged to combine a helper data H and the response R and apply an Error Correcting Code, decoder on the combined data. The output of the Error Correcting Code decoder is the secret S. Although in the embodiment depicted in FIG. 3 the response R and helper data H are combined before applying the Error Correcting Code other implementations are feasible.

The depicted embodiment further comprises a function means FM that is used to calculate the public value PV, by applying a (trapdoor) one-way function on the secret S. The public value PV can be sent to a Trusted Third Party TTP or a Certifying Authority for signing. By communicating the public value PV rather than the secret S, the secret S remains secure.

The object PRVR depicted in FIG. 3 comprises a storage means STM for storing the helper data H and the signed public value PV. Here the public value PV is stored in the form of a certificate CERT returned by the Trusted Third Party TTP.

A particularly advantageous embodiment of the present invention is an object PRVR where all components are integrated on a single semiconductor that comprises a physical token in the form of a security coating deposited on the actual semiconductor. By removing the security coating from the semiconductor the semiconductor can no longer generate the secret S. As the secret S need not be stored in memory, a malicious user cannot obtain the secret S from the semiconductor by removing the security coating and probing the semiconductor. However with the security coating in place it is difficult to probe the semiconductor. The security coating provides an additional barrier against probing.

The object PRVR in FIG. 3 is furthermore fitted with a first communication means CM1 that is arranged to perform wireless Near Field Communication with both the Trusted Third Party TTP and with the apparatus for verifying authenticity VERF. Near Field Communication is particularly interesting for RF ID tags. By bringing a Near Field Communication enabled tag in the vicinity of a tag reader the tag can be powered using an electromagnetic radiation generated by the reader. Subsequently the object PRVR can prove authenticity to the apparatus for verifying authenticity VERF using the method according to the present invention.

Although Near Field Communication is particularly useful for ID tags, other applications may require different communication means. These communication means can be contact based, using conventional sockets, or contact surfaces, or based on alternate contact-less communication means such as optical communication means employing IR.

The present invention can be used to facilitate a wireless LAN where base stations and clients can be authenticated using the present invention before exposing information related to the network such as the network ID and/or the network addresses. In fact the present invention is particularly suitable for performing a first phase during authentication of new devices in a networks and devices in general, wired or wireless.

FIG. 3 also depicts an apparatus for verifying authenticity VERF. This apparatus is the counterpart of the object PRVR, and the embodiment depicted in FIG. 3 comprises a second communication means CM2 for communicating with the object PRVR, as well as a second zero knowledge protocol means ZKPM2 arranged to verify the responses provided by the first zero knowledge protocol means ZKPM1. In addition the apparatus for verifying authenticity VERF comprises an obtaining means OB for extracting the public value PV from the certificate CERT and verifying the accompanying signature. If the public value PV is genuine and the responses from the first zero knowledge protocol means ZKPM1 are correct, then the second zero knowledge protocol means ZKPM2 will generate a positive decision DEC.

Although the object PRVR depicted in FIG. 3 uses a certificate CERT to obtain the public value PV other means can be envisaged that provide the apparatus with a trustworthy public value PV. These alternatives include; (i) a method where the said public value PV is obtained directly from a Trusted Third Party TTP, (ii) a method where an encrypted public value PV is obtained, that is encrypted using a secret key known to the verifier.

An object PRVR for proving authenticity of a product can also be used to repeated enable and disable access to a device or apparatus. A tag fitted with an object according to the present invention that could be used instead of conventional car keys.

Figure 4:
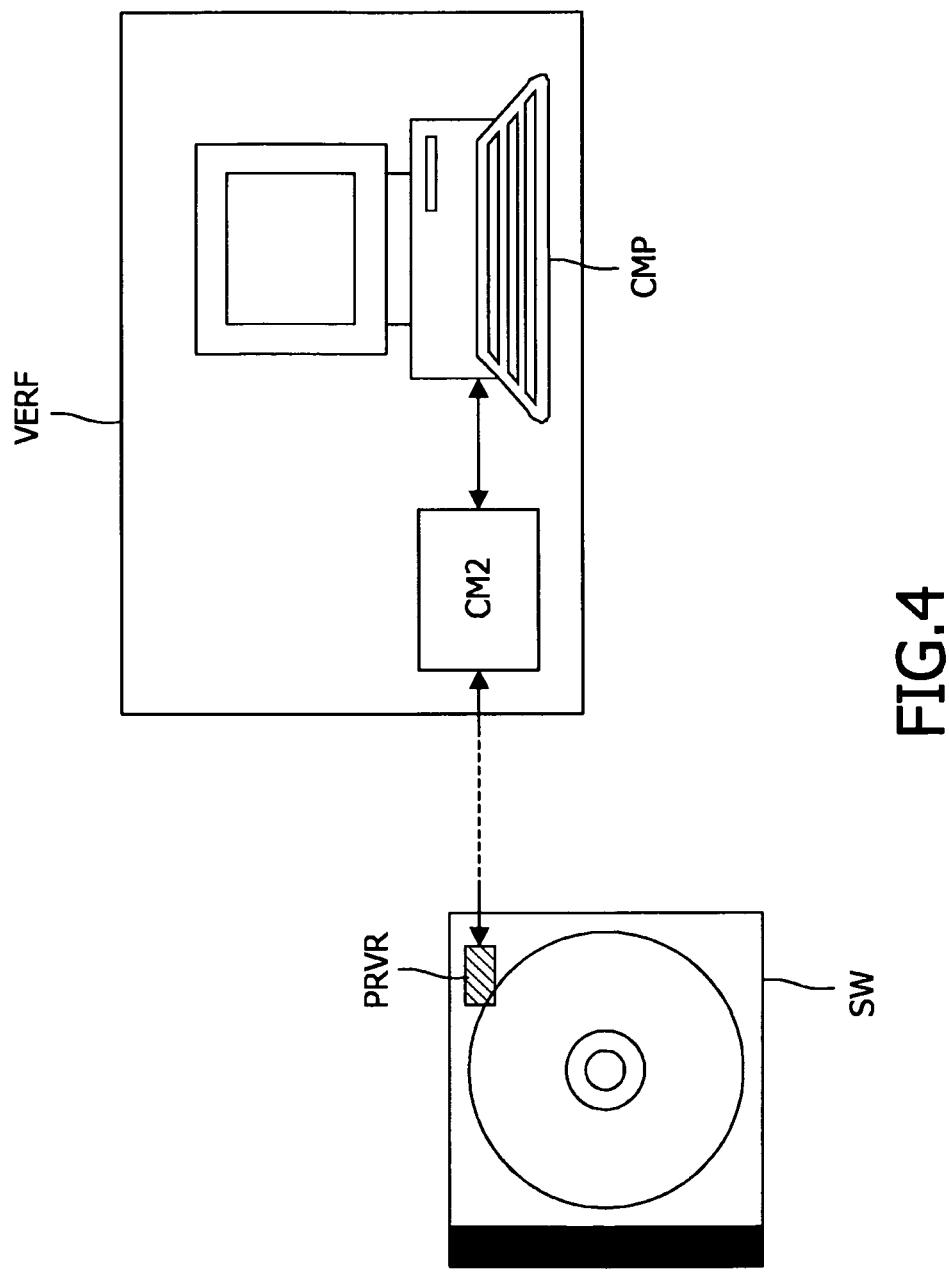
FIG. 4 is a block diagram of a system for proving the authenticity of a software to a verifier before installation according to the present invention.

FIG. 4 depicts an embodiment of a system for proving the authenticity of a software to a verifier before installation. The system comprises a software SW that is to be used in combination with an object PRVR for proving authenticity. The object PRVR could be attached to the carrier, jewel case, packaging, or manual. Alternatively the software could be downloaded and the object PRVR could be used as an enabling token. The system also comprises an apparatus for verifying authenticity VERF comprising of a computer CMP and a second communication means CM2. Although the second communication means CM2 is depicted here as a separate device it could be integrated in said computer CMP.

Once the computer has loaded the installation program, it can execute said program and conduct a zero knowledge protocol with the object PRVR for proving authenticity of the software. When proven to be authentic, it is possible to proceed with the installation. In case the object proves to be a fraud, the installation should be aborted. The advantage of such a system is that it does not require access to a network yet warrants end-users privacy.

To further capitalize on the fact that the PRVR object comprises a physical token PUF, it is possible to subsequently use said physical token PUF to derive further encryption key(s) from the PUF for decrypting the encrypted part of the disc. Alternatively multiple challenge responses could be verified during normal use of the software, or during installation of patches.

Figure 5:
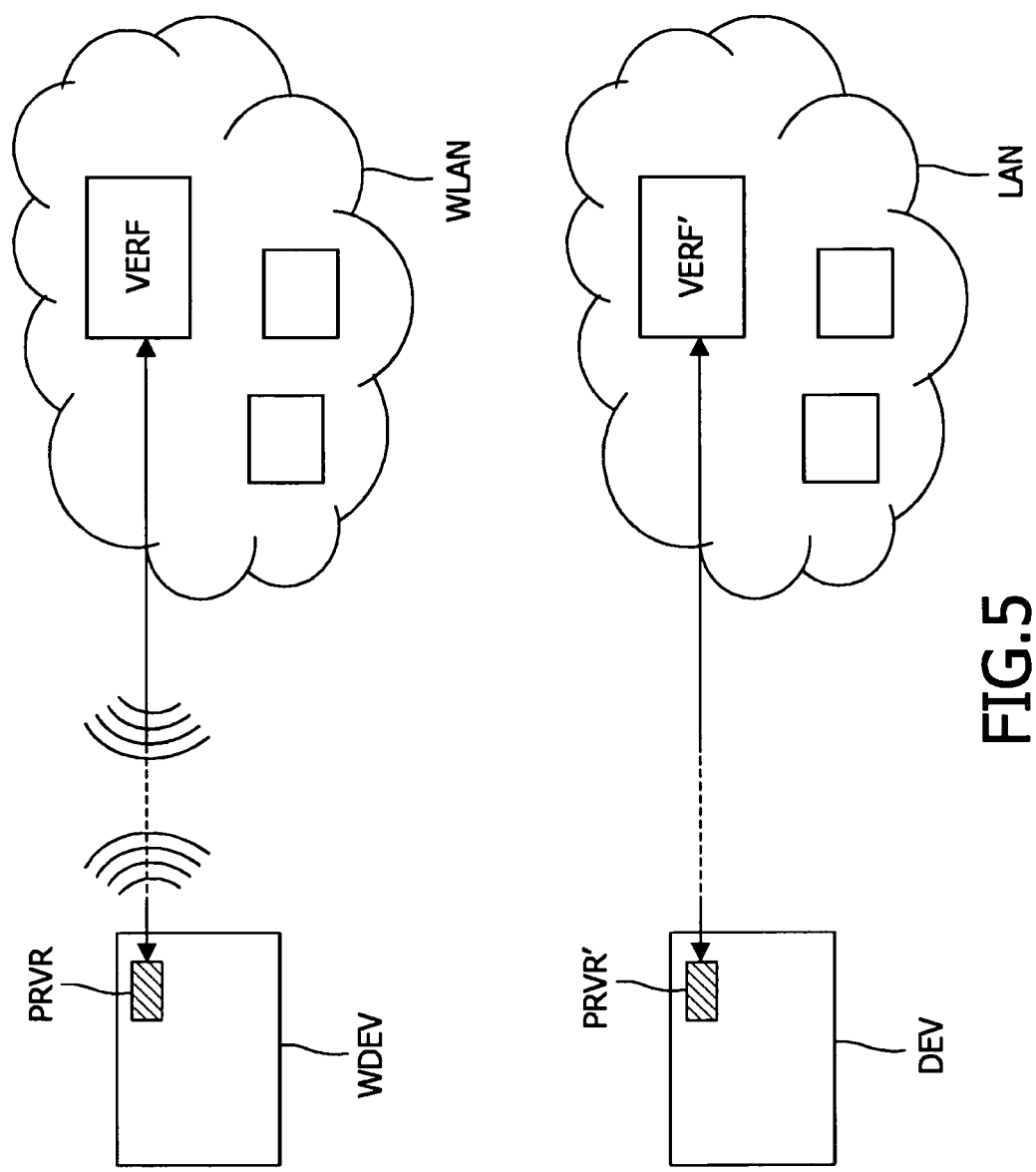
FIG. 5 is a block diagram of two systems for proving authenticity of a device to a verifier in a network.

FIG. 5 presents a block diagram of a system for proving authenticity of a wireless device WDEV to an apparatus for verifying authenticity in a wireless network WLAN. The system comprises a wireless device WDEV that comprises an object PRVR according to the present invention. Before allowing the wireless device WDEV to join the wireless network WLAN, the wireless device WDEV has to prove authenticity to the apparatus for verifying authenticity VERF that is part of the wireless network WLAN. In a preferred embodiment the latter apparatus is a base-station. A user could configure the apparatus for verifying authenticity VERF to deny access to wireless devices that the user deems unsafe. To configure the apparatus for verifying authenticity VERF the user could enroll all devices that are allowed to access the wireless network WLAN during installation.

The present invention can also be employed in a wired network. FIG. 5 also depicts a further system for proving the authenticity of a device DEV to a further apparatus for verifying authenticity VERF' in a wired network LAN. The device DEV has embedded in it a further object PRVR' according to the present invention for proving authenticity.

Figure 6:
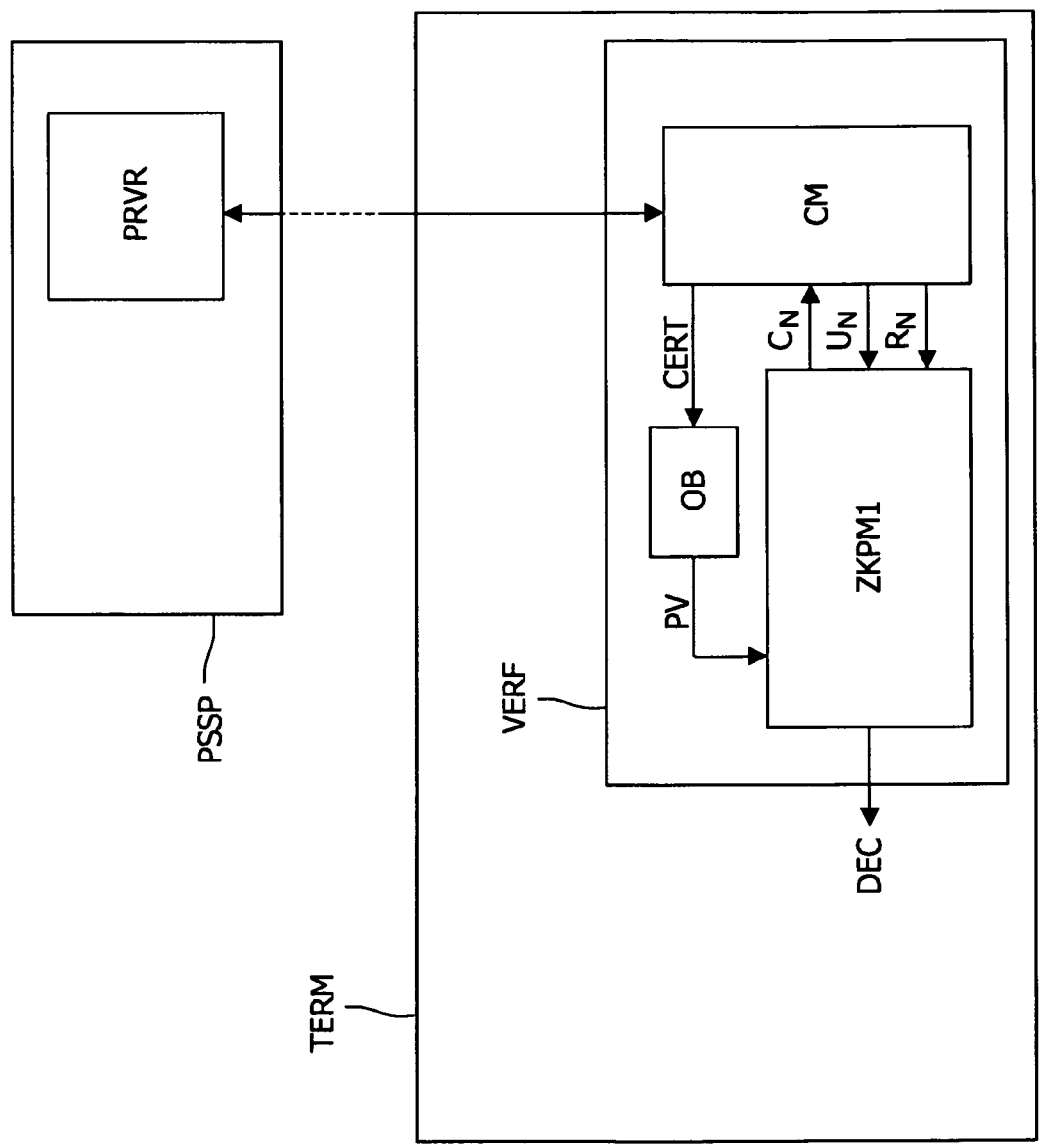
FIG. 6 is a block diagram of a system for proving the authenticity of a passport to a passport authentication terminal according to the present invention.

FIG. 6 depicts an alternate system according to the invention. Here a passport PSSP fitted with an embedded object PRVR for proving authenticity is brought into proximity of a passport authentication terminal TRM. Authenticity can be verified using the method according to the present invention, thereby asserting the fact that the passport PSSP indeed is genuine.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for proving authenticity of a prover device to a verifier device, the method comprising acts of:
generating, by the prover device, a secret using a physical token, the physical token being challengeable in order to evoke a unique response from the physical token, the physical token is a physical unclonable function and comprises many randomly distributed components in a complex physical system, when challenged complex physics governing the interaction between the physical token and the challenge leads to the response, the secret being generated from said response, generating the secret further comprises acts of: generating a response using the physical token, combining the response with a helper data, and applying an Error Correcting Code;
obtaining, by the verifier device, a public value in a form of a certificate which has been derived from the secret using a function, and where the function is selected such that it is computationally expensive to establish the secret given the public value; and
conducting a zero knowledge protocol between the prover device and the verifier device in order to prove to the verifier device that the prover device has access to the physical token, where the prover device makes use of the secret and the verifier device makes use of the public value.

2. The method as claimed in claim 1, wherein the function is a one-way function.

3. The method as claimed in claim 1, wherein the function is a trapdoor one-way function.

4. The method as claimed in claim 1, where the secret is generated using the physical token every time that the secret is needed.

5. The method as claimed in claim 1, where the certificate is signed by a Trusted Third Party, and where the method further comprises an act of verifying the signature of the certificate to establish authenticity of the public value.

6. The method as claimed in claim 1, where the zero knowledge protocol is based on the fact that calculating the eth root modulo N is computationally expensive.

7. The method as claimed in claim 1, where the zero knowledge protocol is based on the fact that calculating discrete logarithms is computationally expensive.

8. The method of claim 1, comprising determining for a pre-determined probability the number of iterations, each iteration having a guessing probability, needed to prove to the verifier device, with the pre-determined probability, that the prover device has access to the physical token, and wherein the zero knowledge protocol uses the number of iterations.

9. An object for proving authenticity, the object comprising:
a physical token;
a secret generator configured to generate a secret using the physical token, the physical token being challengeable in order to evoke a unique response from the physical token, the physical token is a physical unclonable function and comprises many randomly distributed components in a complex physical system, when challenged complex physics governing the interaction between the physical token and the challenge leads to the response, the secret being generated from said response, the secret generator being further configured to: generate a response using the physical token, combine the response with a helper data, and apply an Error Correcting Code;
a storage configured to store a public value in a form of a certificate; and
a first zero knowledge protocol conductor configured to conduct a zero knowledge protocol using the secret, with an apparatus for verifying authenticity, in order to prove to the apparatus for verifying authenticity that the object has access to the physical token, the apparatus for verifying authenticity using the public value.

10. The object as claimed in claim 9, where the object further comprises a function applier configured to apply a function to the secret in order to generate the public value based on the secret, and where the function is selected such that it is computationally expensive to establish the secret given the public value.

11. The object as claimed in claim 10, wherein the function is a one-way function.

12. The object as claimed in claim 10, wherein the function is a trapdoor one-way function.

13. The object as claimed in claim 9, where the secret generator is configured to generate the secret using the physical token every time that the secret is needed.

14. The object as claimed in claim 9, where the object public value is stored as a signed public value.

15. The object as claimed in claim 14, wherein the storage is configured to store helper data.

16. The object as claimed in claim 9, where the object further comprises a first communicator configured to communicate with the apparatus for verifying authenticity.

17. The object as claimed in claim 16, where the first communicator is configured for Near Field Communication.

18. The object as claimed in claim 9, where the first zero knowledge protocol conductor is configured to conduct a zero knowledge protocol that is based on the fact that calculating the eth root modulo N is computationally expensive.

19. The object as claimed in claim 9, where the first zero knowledge protocol conductor is configured to conduct a zero knowledge protocol that is based on the fact that calculating discrete logarithms is computationally expensive.

20. The object as claimed in claim 9, wherein the authenticity is verified to join a network.

21. The object of claim 9, wherein the zero knowledge protocol uses a number of iterations each having a guessing probability, the number of iterations being determined for the pre-determined probability as needed to prove to the apparatus for verifying authenticity, with the pre-determined probability, that a prover has access to the physical token.

22. The object as claimed in claim 9, the certificate comprising a variety of public values corresponding to multiple challenge response pairs of the physical token.

23. The object as claimed in claim 9, wherein the object is an RF ID tag.

24. A system for proving the authenticity of an object to an apparatus for verifying authenticity, the system comprising:
   an object comprising:
      a physical token,
      a secret generator configured to generate a secret using the physical token, the physical token being challengeable in order to evoke a unique response from the physical token, the physical token is a physical unclonable function and comprises many randomly distributed components in a complex physical system, when challenged complex physics governing the interaction between the physical token and the challenge leads to the response, the secret being generated from said response, the secret generator being further configured to: generate a response using the physical token, combine the response with a helper data, and apply an Error Correcting Code;
      a first zero knowledge protocol conductor configured to conduct a zero knowledge protocol with an apparatus for verifying authenticity, in order to prove to the apparatus for verifying authenticity that the object has access to the physical token, using the secret; and
   an apparatus for verifying authenticity, wherein the apparatus for verifying authenticity comprises:
      an obtainer configured to obtain a public value, in a form of a certificate, which has been derived from the secret,
      a second zero knowledge protocol conductor configured to conduct the zero knowledge protocol with the first zero knowledge protocol conductor, in order to verify that the object has access to the physical token, using the public value.

25. The system as claimed in claim 24, wherein the object is delivered together with a software, and the apparatus for verifying authenticity is a computer configured to run an authenticity verification program for conducting a zero knowledge protocol with said object, in order to prove authenticity of said software with the predetermined probability before allowing said software to be installed.

26. The system as claimed in claim 24, wherein the object is embedded in a passport, and the apparatus for verifying authenticity is a passport authentication terminal configured to conduct a zero knowledge protocol with said object, in order to prove authenticity of said passport with the predetermined probability.

* * * * *